United States Patent [19]

Heining

[11] Patent Number: 5,796,230
[45] Date of Patent: Aug. 18, 1998

[54] METHOD FOR TRIGGERING A FINAL CONTROL ELEMENT

[75] Inventor: Joern Heining, Bensberg, Germany

[73] Assignee: Siemens Aktiengesellschaft, Munich, Germany

[21] Appl. No.: 683,088

[22] Filed: Jul. 18, 1996

[30] Foreign Application Priority Data

Jul. 18, 1995 [DE] Germany .............. 195 26 218.2

[51] Int. Cl.⁶ .................................................. G05B 11/28
[52] U.S. Cl. .................. 318/599; 318/811; 388/811
[58] Field of Search ........................ 318/599, 600, 318/685, 696, 807–811, 503, 601–603; 388/814, 811, 829, 831, 832

[56] References Cited

U.S. PATENT DOCUMENTS

| | | | |
|---|---|---|---|
| 4,542,329 | 9/1985 | Xuan | 318/696 |
| 4,550,279 | 10/1985 | Klein | 318/696 |
| 5,247,235 | 9/1993 | Tu et al. | 318/685 |

FOREIGN PATENT DOCUMENTS

| | | |
|---|---|---|
| 42 18 541 | 12/1993 | Germany. |
| 44 03 156 | 8/1994 | Germany. |

*Primary Examiner*—Brian Sircus
*Attorney, Agent, or Firm*—Herbert L. Lerner; Laurence A. Greenberg

[57] ABSTRACT

A method for triggering or controlling a final control element uses a pulse width modulated signal. A sequence of the pulse width modulated signal is fixed by a predetermined time raster. After a predetermined number of standard pulses, one standard pulse is emitted and one long pulse follows that is twice as long as one standard pulse. In this way, seizing of the final control element is reliably prevented.

4 Claims, 2 Drawing Sheets

METHOD FOR TRIGGERING A FINAL CONTROL ELEMENT

BACKGROUND OF THE INVENTION

FIELD OF THE INVENTION

The invention relates to a method for triggering or controlling a final control element, wherein a desired value for a position of the final control element is specified and a duty cycle of a pulse width modulated signal is ascertained as a function of the desired value, for determining the position of the final control element on chronological average.

A system for triggering a final control element that is already known from German Published, Non-Prosecuted Application DE 42 18 541 A1 triggers the final control element with pulses of a pulse width modulated signal to prevent seizing of the final control element. The frequency of the pulse width modulated signal is switched back and forth between two frequencies F1 and F2. The switchover between the two frequencies F1 and F2 is effected as a function of at least one operating variable of an internal combustion engine. That system is relatively complicated and expensive, since two oscillators are required. Moreover, the switchover between the two frequencies is performed as a function of an operating variable that is first ascertained and evaluated before the switchover takes place.

A circuit device that is known from German Published, Non-Prosecuted Application DE 44 03 156 A1 supplies a final control element with output signals having a rectangular characteristic and defined frequency as well as a defined duty cycle, along with cyclical test rectangular signals and/or static test output signals, in order to trigger the final control element. In that way, defective program execution is detected.

SUMMARY OF THE INVENTION

It is accordingly an object of the invention to provide a method for triggering a final control element, which overcomes the hereinafore-mentioned disadvantages of the heretofore-known methods of this general type, which is simple and which moreover reliably prevents seizing of a final control element regardless of operating variables.

With the foregoing and other objects in view there is provided, in accordance with the invention, a method for controlling a final control element, which comprises specifying a desired value for a position of the final control element; ascertaining a duty cycle of a pulse width modulated signal as a function of the desired value; determining the position of the final control element on chronological average; fixedly specifying a period of the pulse width modulated signal; emitting one standard pulse after a predetermined number of periods of the pulse width modulated signal with standard pulses of a standard duration, being specified with a ratio of the standard duration to the period being equivalent to the duty cycle; and then following with one long pulse having a long pulse duration being greater than the standard duration, in following periods of the pulse width modulated signal.

Since a standard pulse is emitted after a predetermined number of periods of standard pulses, and a long pulse then follows, there is a high probability of preventing seizing of the final control element. Moreover, no oscillators that are otherwise used are needed.

In accordance with another mode of the invention, the long pulse duration is twice as long as the standard duration. This is advantageous because then the position of the final control element on chronological average is not changed by the long pulse.

In accordance with a concomitant mode of the invention, there is provided a method which comprises setting the standard number of pulses, after which a long pulse follows, to be greater than 2.

Other features which are considered as characteristic for the invention are set forth in the appended claims.

Although the invention is illustrated and described herein as embodied in a method for triggering a final control element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
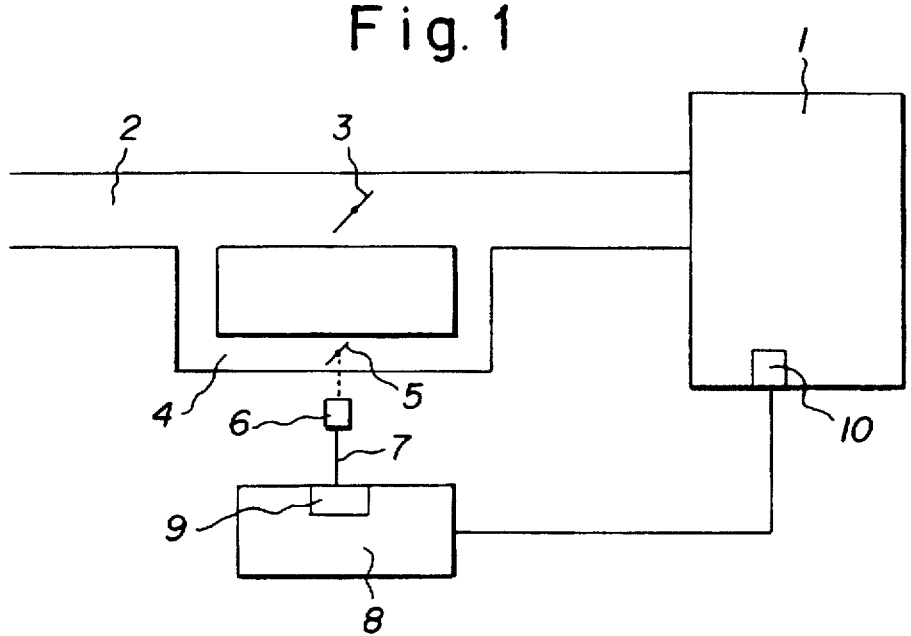
FIG. 1 is a block circuit diagram of a device for performing the method of the invention.

Referring now to the figures of the drawings in detail and first, particularly, to FIG. 1 thereof, there is seen a motor vehicle engine 1 that communicates with an intake pipe or tube 2. A throttle valve 3 is disposed in the intake pipe 2. A bypass line 4 is constructed parallel to the throttle valve 3. A bypass valve 5 is incorporated as a final control element in the bypass line 4. The bypass valve 5 is mechanically coupled to an adjusting device 6. The adjusting device 6 is connected through a control line 7 to a central processor 8. The central processor 8 has a modulator 9 that generates a pulse width modulated signal $S_{pwm}$ shown in FIG. 3 with a predetermined period $t_p$, such as 6.25 ms.

The central processor 8 ascertains a desired value for the position of the bypass valve 5, as a function of an operating state of the motor vehicle engine 1, such as the idling state, and optionally as a function of at least one operating variable of the motor vehicle engine 1, such as an engine speed. Preferably, a position controller for the bypass valve specifies a duty cycle TV of the pulse width modulated signal $S_{pwm}$, as a function of the desired value and of a detected actual value of the position of the bypass valve 5.

In another embodiment of the invention, the duty cycle is read out of a performance graph stored in memory, as a function of the desired value. The signal $S_{pwm}$ is then generated with the duty cycle TV by the modulator 9. The modulator 9 triggers the adjusting device 6 with the signal $S_{pwm}$. Airflow through the bypass line 4 is defined by the position of the bypass valve 5.

Through the use of the pulse width modulated signal, the bypass valve 5 assumes a position on chronological average that can be specified by the duty cycle TV, since the system including the adjusting device 6 and the bypass valve 5, because of its inertia, cannot follow the fundamental wave of the pulse width modulated signal $S_{pwm}$.

According to the invention, the adjusting device 6 is triggered with the signal $S_{pwm}$ having a period which is fixedly specified, for instance being 6.25 ms. In other words, the signal $S_{pwm}$ has a frequency of 160 Hz. The frequency of the signal $S_{pwm}$ is specified in such a way that it is above the resonant frequency of the system including the adjusting device 6 and bypass valve 5.

In order to assure that seizing of the bypass valve 5 will be reliably prevented, after a predetermined number of periods tp of the signal $S_{pwm}$ of standard pulses SP, one standard pulse SP is emitted and then a long pulse LP is emitted. The long pulse LP lasts longer than the standard pulse SP and preferably it is twice as long as the standard pulse SP.

Figure 3:
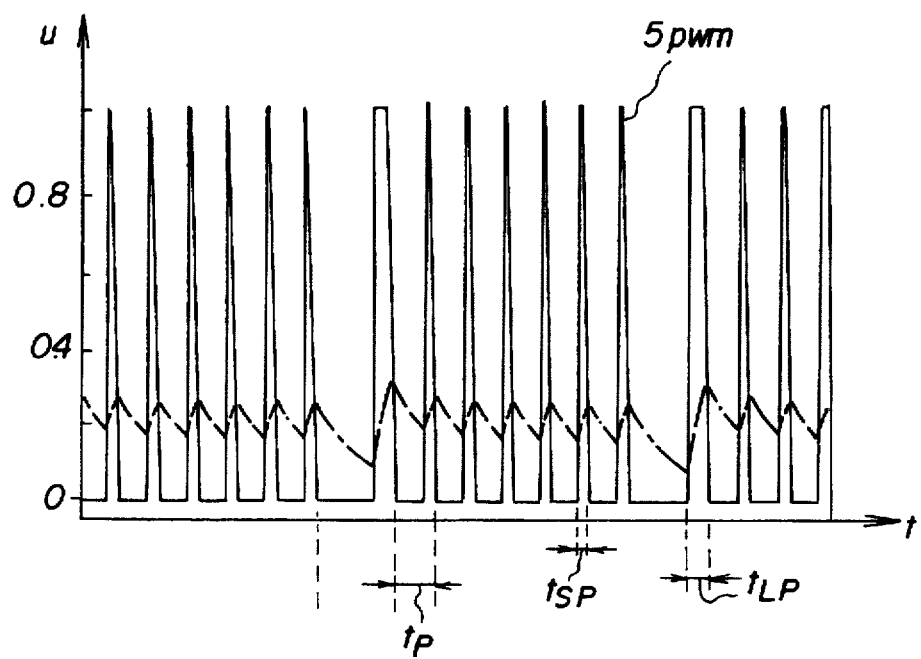
FIG. 3 is a diagram of a pulse width modulated signal $S_{pwm}$.

The standard pulse SP has a standard duration $t_{SP}$ shown in FIG. 3, which is specified in such a way that the ratio of the standard duration $t_{SP}$ to the period $t_p$ is equivalent to the duty cycle TV that is specified by a desired value SW.

In the following exemplary embodiment, one standard pulse is emitted after six standard pulses.

Since at least one standard pulse SP is emitted after a predetermined number of standard pulses, and the duration of the ensuing long pulse LP is greater than the standard duration, the frequency range of the signal $S_{pwm}$ is enriched with subharmonic frequency components. The frequencies of the subharmonic frequency components are below the frequency of the signal $S_{pwm}$, which has only standard pulses SP. The subharmonic frequency components effect an overcoming of the static friction of the bypass valve 5, so that seizing is reliably avoided.

Figure 2:
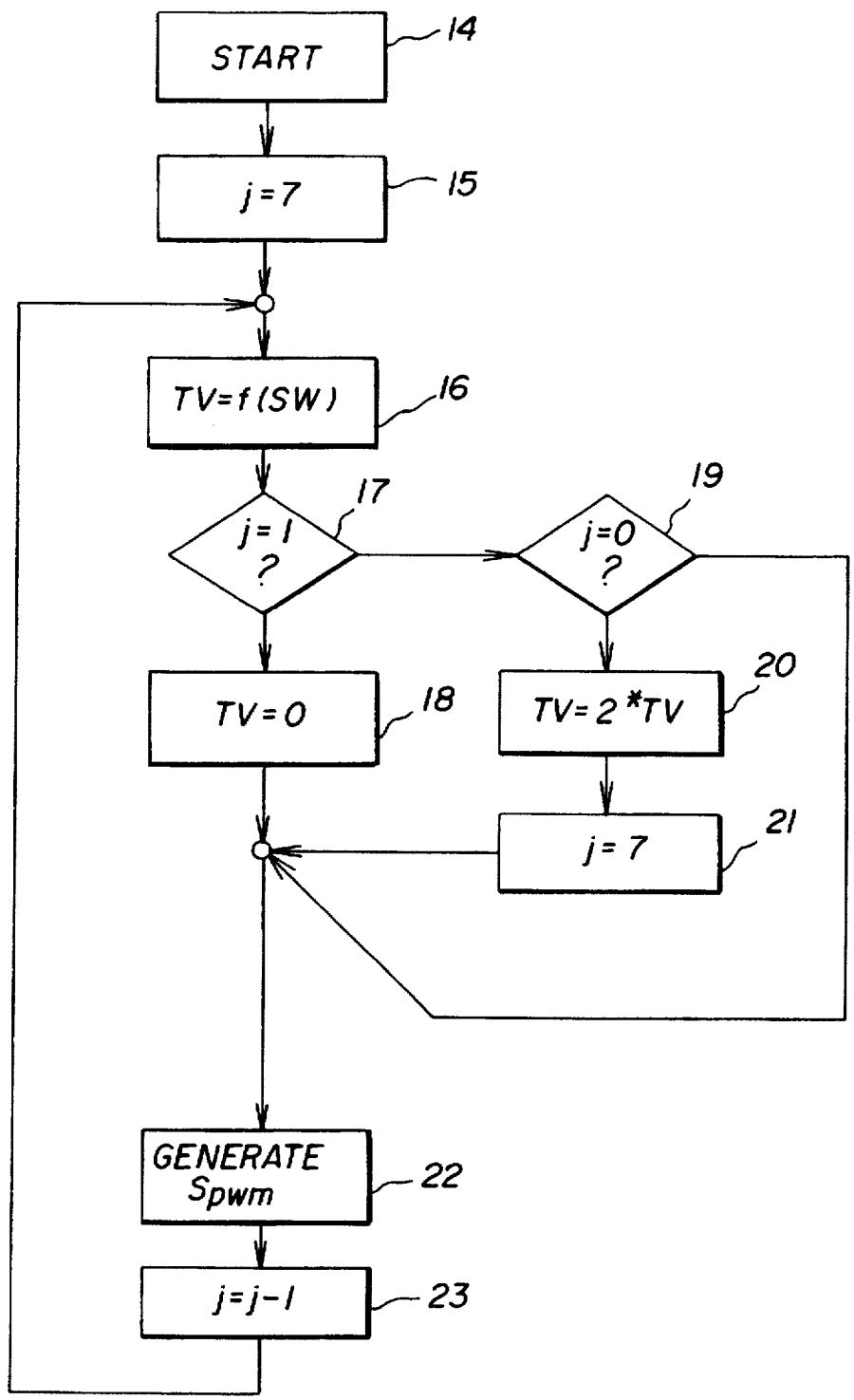
FIG. 2 is a flow chart showing a program sequence.

The mode of operation of FIG. 1 will be described in further detail below through the use of the program sequence shown in the flow diagram of FIG. 2. The program shown in FIG. 2 is stored in memory in the central processor 8.

The program is started in a step 14. Initialization operations are performed in step 15. For instance, a variable j, which is a counter for the number of periods, is occupied by the value 7.

The desired value SW which is ascertained in a step 16, is a function of the operating state of the motor vehicle engine 1 and of the engine speed. This desired value SW is delivered to a position controller which is known per se but is not shown since it is not essential to the invention. The position controller forms a control difference between the desired value SW and a detected actual value of the position of the bypass valve 5. The controller exhibits proportional, or proportional and integral, or proportional, integral and differential control behavior. The desired value simultaneously acts as a pilot control variable for the position controller. The position controller generates the duty cycle TV at its output. However, the duty cycle TV may equally be stored in memory in a performance graph that is dependent on the desired value SW.

In a step 17, a check is performed as to whether or not the variable j has the value of 1. If so, a branch to step 18 is taken, where the duty cycle TV is set to zero. Accordingly, one standard pulse SP is then emitted.

If the variable j in the step 17 does not have the value 1, then a path to a step 19 is taken, where a check is performed as to whether or not the variable j has the value 0. If not, then a path to a step 22 is taken. If so, however, then a path to a step 20 is taken, in which the duty cycle TV is assigned twice the value of the duty cycle TV. In that case, one long pulse LP is then emitted, which is twice as long as the standard pulse SP. In a step 21, the variable j is again assigned to the value 7. In the step 21, the variable is still occupied by the same value as in the step 15.

In a step 22, the signal $S_{pwm}$ is generated. To that end, the central processor 8 supplies the duty cycle as an input variable to the modulator 9, which thereupon generates a period $t_p$ of the signal $S_{pwm}$ with the duty cycle TV. Preferably, in the step 22, the program waits until the modulator 9 has generated the last period of the signal $S_{pwm}$, before transmitting the new duty cycle TV to the modulator.

In a step 23, the counter j is then decremented by 1, and the processing then continues in the step 16.

In FIG. 3, the voltage U of the signal $S_{pwm}$ is plotted over the time t. The period $t_p$, that is the time within which at maximum one pulse is generated, is 6.25 ms. The standard duration or pulse length $t_{SP}$ in this exemplary embodiment is constantly 1.25 ms, corresponding to a duty cycle TV of 0.2. The long pulse length $t_{LP}$ in this exemplary embodiment is twice as long as the standard pulse length $t_{SP}$. The voltage is standardized to 1 and in this exemplary embodiment is equivalent to 12 V. The dashed line in FIG. 3 corresponds to the course over time of the current that is supplied to the adjusting device 6.

The specified rhythm at which one standard pulse SP is emitted and thereupon one long pulse LP is output, which is twice as long as a standard pulse SP, after the number of six standard pulses, can clearly be seen in FIG. 3.

The effect of the method of the invention is based on the fact that in comparison with a uniform pulse width modulated signal, that is a succession of pulses of equal length with equal time intervals between them, a shift in the frequency components of the pulse width modulated signal to lower frequencies takes place.

The lower-frequency frequency components bring about increased oscillation of the bypass valve 5, as a result of which the static friction is overcome and seizing of the bypass valve 5 is reliably avoided.

The direct component of the pulse width modulated signal $S_{pwm}$ is, on chronological average, not varied by the low-frequency frequency components. It is thus assured that the bypass valve on chronological average will be in the position specified by the central processor 8 through the use of the desired value SW, and thus the quantity of air supplied by the bypass valve 5 to the motor vehicle engine 1 remains constant over time. Other devices to be adjusted may be connected to the adjusting device 6 instead of the bypass valve 5.

The values chosen in the exemplary embodiment for the voltage, the period of the pulse width modulated signal $S_{pwm}$, the number of standard pulses SP after which a long pulse LP follows, the time interval between one standard pulse SP and one long pulse LP, and the long pulse duration $t_{LP}$ will be assigned different values by one skilled in the art for different given technical situations.

I claim:

1. In a method for controlling a final control element, which includes specifying a desired value for a position of the final control element, ascertaining a duty cycle of a pulse width modulated signal as a function of the desired value, and determining the position of the final control element on chronological average, the improvement which comprises:

fixedly specifying a period of the pulse width modulated signal;

emitting one standard pulse after a predetermined number of periods of the pulse width modulated signal with standard pulses of a standard duration, being specified with a ratio of the standard duration to the period being equivalent to the duty cycle; and then following with one long pulse having a long pulse duration being greater than the standard duration, in following periods of the pulse width modulated signal.

2. The method according to claim 1, which comprises setting the long pulse duration to be twice as long as the standard duration.

3. The method according to claim 1, which comprises setting the standard number of pulses, after which a long pulse follows, to be greater than 2.

4. In a method for controlling a final control element, which includes specifying a desired value for a position of the final control element, ascertaining a duty cycle of a pulse width modulated signal as a function of the desired value, and determining the position of the final control element on chronological average, the improvement which comprises:

fixedly specifying a period of the pulse width modulated signal;

emitting one standard pulse after a predetermined number of periods of the pulse width modulated signal with standard pulses of a standard duration, being specified with a ratio of the standard duration to the period being equivalent to the duty cycle;

then following with one long pulse having a long pulse duration being greater than the standard duration, in following periods of the pulse width modulated signal; and performing all of the steps with a single oscillator.

* * * * *